(12) United States Patent
Delaporte

(10) Patent No.: US 6,619,110 B1
(45) Date of Patent: Sep. 16, 2003

(54) MODULE FOR MEASURING TIRE PRESSURE

(75) Inventor: Françis Delaporte, Osny (FR)

(73) Assignee: Johnson Controls Automotive Electronics (FR)

( * ) Notice: Subject to any disclaimer, the term of this patent is extended or adjusted under 35 U.S.C. 154(b) by 0 days.

(21) Appl. No.: 09/856,917

(22) PCT Filed: Dec. 10, 1999

(86) PCT No.: PCT/FR99/03083
§ 371 (c)(1),
(2), (4) Date: May 30, 2001

(87) PCT Pub. No.: WO00/35685
PCT Pub. Date: Jun. 22, 2000

(30) Foreign Application Priority Data

Dec. 11, 1998 (FR) .............................................. 98 15665

(51) Int. Cl.$^7$ .......................... B60C 23/02; G01M 17/02
(52) U.S. Cl. ........................................ 73/146.2; 73/146
(58) Field of Search .......................... 73/146, 706, 721, 73/727, 756, 146.2, 146.3, 146.8; 128/673, 675; 340/447

(56) References Cited

U.S. PATENT DOCUMENTS

| 4,252,126 A | * | 2/1981 | Mandl ........................ 128/673 |
| 4,734,674 A | | 3/1988 | Thomas et al. ............... 340/58 |
| 5,661,244 A | * | 8/1997 | Nishimura et al. ........... 73/706 |
| 5,774,056 A | * | 6/1998 | Berry, III et al. ........... 340/607 |
| 2001/0029786 A1 | * | 10/2001 | Takakuwa et al. ............ 73/706 |

* cited by examiner

Primary Examiner—Andrew H. Hirshfeld
Assistant Examiner—Marissa Ferguson
(74) Attorney, Agent, or Firm—Foley & Lardner

(57) ABSTRACT

The module comprises an air pressure sensor (3) with an air intake (4), a card (5) for supporting a printed circuit, the sensor (3) being mounted on said card, and an anti-contamination filter (6) for protecting the air inlet (4). The filter (6) extends through said card (5) and is in contact with the surface (3) via a contact surface (14, 15) forming a single sealing surface helping to seal the air inlet (4)

22 Claims, 1 Drawing Sheet

MODULE FOR MEASURING TIRE PRESSURE

Figure 1:
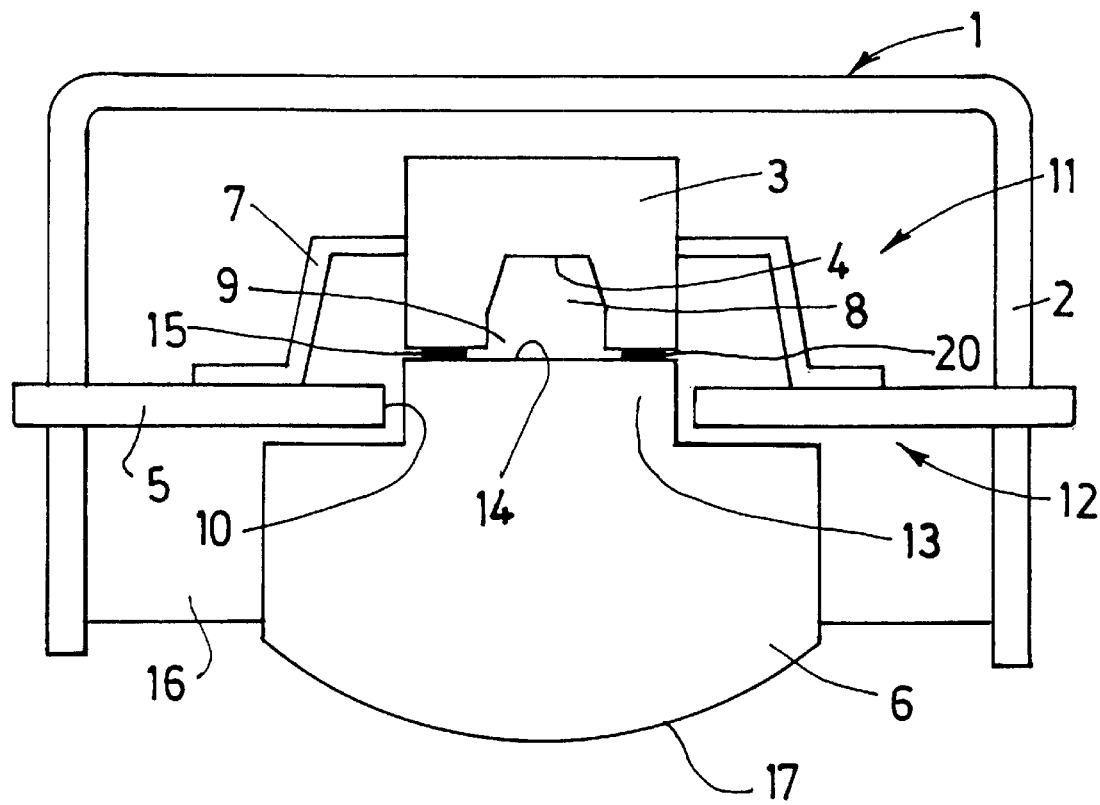

The invention relates to a module for measuring tire pressure, especially used for measuring the air pressure inside a tire of a motor vehicle so as to warn the conductor of a dangerous underinflation or overinflation of the tire.

In general, the pressure measurement module is fastened to the rim of the tire and comprises, in a case, a pressure sensor with an air inlet, a card supporting a printed circuit, the sensor being mounted on said card, and a communication channel between the air inlet of the sensor and the inside of the tire, all these components being embedded in a vibration-resistant protective encapsulating resin. The sensor and the channel both bear against the card supporting the printed circuit, on each side of the card, in line with an opening passing through the card.

The pressure measurement module is exposed to environmental attack from rain, soap, dust, carbon particles and above all blowout-repair products. There is a risk of all these agents contaminating, or even obstructing, the air inlet of the pressure sensor and consequently damaging the sensor. In particular, blowout-repair products, generally silicone-based, are injected in liquid form into the tire should the latter suffer a blowout, and then they cure and solidify under the action of the air pressure, thus obstructing all the orifices, including the air inlet of the pressure sensor. Furthermore, when manufacturing the sensor the protective encapsulating resin is poured in the form of a liquid with a very low viscosity, so that if the sealing in the mating plane between the printed-circuit board and the channel and in the mating plane between the printed-circuit board and the sensor is insufficient, there is also the risk of the air inlet being obstructed by the resin.

In short, there is a not insignificant risk of contamination, or even of obstruction, of the air inlet of the pressure sensor in pressure measurement modules of the prior art. The present invention aims to reduce this drawback.

For this purpose, the invention relates to a pressure measurement module comprising an air pressure sensor, with an air inlet, and an anti-contamination filter for protecting the air inlet, characterized in that the sensor is mounted on a card for supporting a printed circuit, the filter extends through said card and a contact surface is provided between the filter and the sensor, forming a single sealing surface helping to seal the air inlet.

Thanks to the filter, impurities and liquids are prevented from getting near to the air inlet of the sensor and the number of sealing surfaces is reduced compared with the pressure measurement modules of the prior art. The filter, since it helps to seal, consequently has a sealing function.

In a preferred embodiment, the filter is attached to the sensor by an impermeable adhesive.

Also preferably, the filter is external to the sensor.

Advantageously, the sensor and part of the filter are embedded in a protective encapsulating resin which acts as a brace, pressing the filter against the sensor.

During manufacture of the sensor, the filter is pressed against the sensor by the action of a thrust spring and the resin is injected in liquid form. After the resin has solidified and the spring has been removed, the solidified resin maintains the compressive force, thus ensuring that the filter is pressed against the sensor. This further improves the sealing of the junction between the filter and the sensor.

Also advantageously, the filter is made of a hydrophobic material.

Finally, the filter preferably has a convex free surface for air intake.

The convex shape of the air intake surface of the filter helps to expel the impurities, their expulsion being assisted by the centrifugal force, and furthermore allows the air intake surface to be easily cleaned, by simply scraping it.

Figure 2:
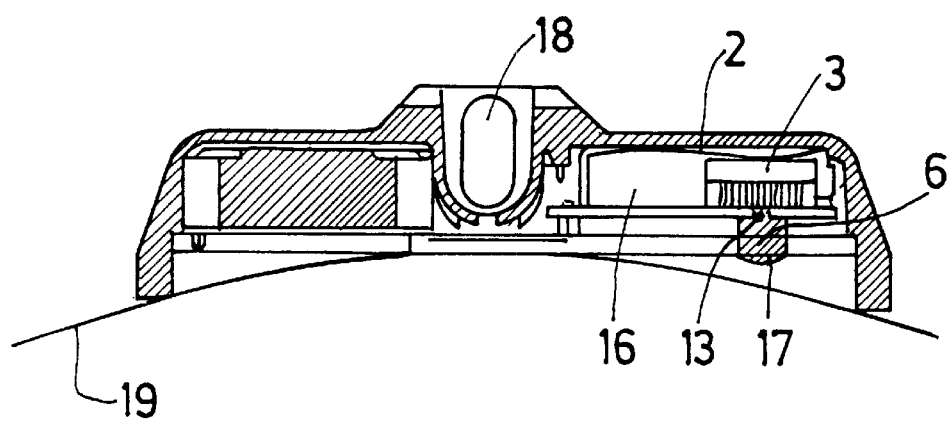

The invention will be more clearly understood from the following description of one particular embodiment of the pressure measurement module of the invention, with reference to the appended drawing in which:

FIG. 1 shows a side view of the tire-pressure measurement module, according to the particular embodiment; and FIG. 2 shows a cross-sectional side view of the module in FIG. 1 mounted on a tire rim.

In the particular example in the description, the tire-pressure measurement module 1 is intended to measure the air pressure inside a motor-vehicle tire.

The module 1 comprises, in a case 2, an air-pressure measurement sensor 3, with an air inlet 4, a card 5, in this case made of copper, supporting a printed circuit, and an anti-contamination filter 6 for protecting the air inlet 4, external to the sensor 3.

The sensor 3, placed on one side 11 of the card 5, is mounted on the latter and connected to the printed circuit via fastening and connecting leads 7.

The air inlet 4 lies at the bottom of a cavity 8, which is made in the sensor 3 and is open towards the card 5 via an opening 9 located in line with a through opening 10 made in the card 5 for passage of the anti-contamination filter 6.

The filter 6 lies partly on the opposite side 12 of the card 5 from the side 11, and extends through the card 5 by means of an extension 13 housed in the opening 10. The extension 13 has an end surface 14, which here is flat, adhesively bonded (20) to a surface 15 of the sensor 3, lying in the plane of the opening 9 and surrounding the latter. The filter 6 thus obstructs the opening 9 of the sensor 3 with its extension 13.

The anti-contamination filter 6 is made of a microporous plastic, in this case having the registered trademark "Porex", which has been made hydrophobic. Its function is to filter the air, in other words to allow air to pass through it but to prevent liquid and impurities passing through it.

The adhesive 20 between the sensor 3 and the filter 6 seals the junction between these two elements 3 and 6. The sensor 3/filter 6 junction prevents liquids and impurities from getting near to the air inlet 4. It should be emphasized here that the contact surface between the sensor 3 and the filter 6 forms the only sealing surface of the module 1 helping to seal the air inlet 4 of the sensor 3. The filter 6, which helps to seal the air inlet 4 of the sensor 3, consequently has a sealing function.

The sensor 3, the card 5 and part of the filter 6 are embedded in a vibration-resistant protective encapsulating resin 16.

The filter 6 has a free air-intake surface 17, on the opposite side from the end surface 14 which is not embedded-in the resin 16 and is in contact with the air, the pressure of which is equal to that inside the tire. The surface 17 is of convex shape, which helps to expel the impurities by centrifugal force and makes cleaning it easier, simply by scraping it.

An air intake valve 18, fastened to a rim 19 of the tire, is integral with the module 1 and connects the inside of the tire to the environment around the module 1, so that the air pressure around the module 1 is equal to that inside the tire.

During manufacture of the module 1, after the sensor 3 has been mounted on the card 5 and the filter 6 has been adhesively bonded to the sensor 3, the filter 6 is forced against the sensor 3, by the thrust force of a spring, and the resin 16 in liquid form is poured in. While the resin 16 is being poured in, the filter 6 and the sealing surface between the sensor 3 and the filter 6 seal the air inlet 4 and therefore prevent the liquid resin from getting near to the air inlet 4. The pressure on the filter 6 is maintained until the resin 16 has solidified, and then the force is relaxed, by removing the spring. The solidified resin 16 then acts as a brace holding the filter 6 firmly against the sensor 3.

In operation, the air surrounding the module 1 enters the sensor 3 via the air inlet 4, after having passed through the intake surface 17 and then through the anti-contamination filter 6. The filter 6 filters the air and prevents any liquids and impurities from getting as far as the air inlet 4.

What is claimed is:

1. A module for measuring tire pressure, comprising an air pressure sensor (3), with an air inlet (4), and an anti-contamination filter (6) for protecting the air inlet (4), characterized in that the sensor (3) is mounted on a card (5) for supporting a printed circuit, the filter (6) extends through said card (5) and a contact surface (14, 15) is provided between the filter (6) and the sensor (3), forming a single sealing surface helping to seal the air inlet (4).

2. The module as claimed in claim 1, in which the filter (6) is attached to the sensor (3) by an impermeable adhesive (20).

3. The module as claimed in claim 1, in which the filter (6) is external to the sensor (3).

4. The module as claimed in claim 1, in which the sensor (3) and part of the filter (6) are embedded in a protective encapsulating resin (16) which acts as a brace, pressing the filter (6) against the sensor (3).

5. The module as claimed in claim 1, in which the filter (6) is made of a hydrophobic material.

6. The module as claimed in claim 1, in which the filter (6) has a convex free surface (17) for air intake.

7. The module as claimed in claim 1, in which the filter (6) is made of a microporous material.

8. The module as claimed in claim 2, in which the filter (6) is external to the sensor (3).

9. The module as claimed in claim 2, in which the sensor (3) and part of the filter (6) are embedded in a protective encapsulating resin (16) which acts as a brace, pressing the filter (6) against the sensor (3).

10. The module as claimed in claim 3, in which the sensor (3) and part of the filter (6) are embedded in a protective encapsulating resin (16) which acts as a brace, pressing the filter (6) against the sensor (3).

11. The module as claimed in claim 8, in which the filter (6) is made of a hydrophobic material.

12. The module as claimed in claim 8, in which the filter (6) has a convex free surface (17) for air intake.

13. The module as claimed in claim 8, in which the filter (6) is made of a microporous material.

14. The module as claimed in claim 9, in which the filter (6) is made of a hydrophobic material.

15. The module as claimed in claim 9, in which the filter (6) has a convex free surface (17) for air intake.

16. The module as claimed in claim 9, in which the filter (6) is made of a microporous material.

17. The module as claimed in claim 10, in which the filter (6) is made of a hydrophobic material.

18. The module as claimed in claim 10, in which the filter (6) has a convex free surface (17) for air intake.

19. The module as claimed in claim 10, in which the filter (6) is made of a microporous material.

20. A module for measuring tire pressure, comprising an air pressure sensor, with an air inlet, and an anti-contamination filter protecting the air inlet, wherein the filter extends through a card carrying electronic components and the sensor is coupled to the card.

21. The module as claimed in claim 20, wherein the filter is fixed to the sensor by an adhesive.

22. The module as claimed in claim 20, wherein a contact surface is provided between the filter and the sensor, and wherein the filter is fixed to the sensor along the contact surface.

* * * * *